US012625841B2

(12) United States Patent
DeCesaris et al.

(10) Patent No.: US 12,625,841 B2
(45) Date of Patent: May 12, 2026

(54) NETWORK CONTROLLER SIDEBAND INTERFACE RETIMER

(71) Applicant: Lenovo Enterprise Solutions (Singapore) Pte. Ltd., New Tech Park (SG)

(72) Inventors: Michael DeCesaris, Carrboro, NC (US); Milton Cobo, Raleigh, NC (US); Grason Humphrey, Raleigh, NC (US); Eric Li, Chapel Hill, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/657,143

(22) Filed: May 7, 2024

(65) Prior Publication Data

US 2025/0348454 A1     Nov. 13, 2025

(51) Int. Cl.
  *G06F 13/42*        (2006.01)
  *G06F 13/40*        (2006.01)
(52) U.S. Cl.
  CPC ...... *G06F 13/4291* (2013.01); *G06F 13/4068* (2013.01)
(58) Field of Classification Search
  CPC .................................................. G06F 13/1605
  See application file for complete search history.

(56) References Cited

U.S. PATENT DOCUMENTS

| | | | | |
|---|---|---|---|---|
| 6,539,488 | B1 * | 3/2003 | Tota | ........................... G06F 5/06 713/400 |
| 11,543,852 | B2 * | 1/2023 | Levi | ..................... H04J 3/0688 |
| 2017/0052914 | A1 * | 2/2017 | Aldebert | ............. G06F 13/3625 |

OTHER PUBLICATIONS

Gerald, "Search for RMII Redriver/Retimer", Texas Instruments Ti E2E, posted Feb. 18, 2022, date downloaded on Feb. 27, 2024, pp. 1-5.
Morrison, "PCI Express Retimers vs. Redrivers: An Eye-Popping Difference", PCI SIG, posted Sep. 2, 2019, date downloaded on Feb. 27, 2024, pp. 1-6.
"PCI Express Retimers vs. Redrivers: An Eye-Popping Difference", Astera Labs, date downloaded on Feb. 27, 2024, pp. 1-9.
Juan, "Re-Timers Ensure High Quality 10G Signals", Analogix, Aug. 13, 2018, date downloaded on Feb. 27, 2024, pp. 1-8.

* cited by examiner

*Primary Examiner* — Henry Tsai
*Assistant Examiner* — Juanito C Borromeo
(74) *Attorney, Agent, or Firm* — Kunzler Needham & Hilton; Bruce R. Needham

(57) ABSTRACT

An apparatus with a network controller sideband interface retimer includes a second clock circuit configured to transmit a second clock signal to a NIC. The second clock signal is separate from a first clock signal from a clock connected to a BMC. The apparatus includes a NIC data relay circuit configured to receive data packets from the NIC on a first reduced media independent interface ("RMII") bus and to transmit the received data packets to the BMC over a second RMII bus. The apparatus includes a clock delay circuit configured to add a delay to the second clock signal to create a delayed second clock signal. The delay is adjusted to cause the delayed second clock signal to coincide with a time during receipt of the data packets received from the NIC when data of a bit of the data packets received from the NIC is valid.

20 Claims, 11 Drawing Sheets

101

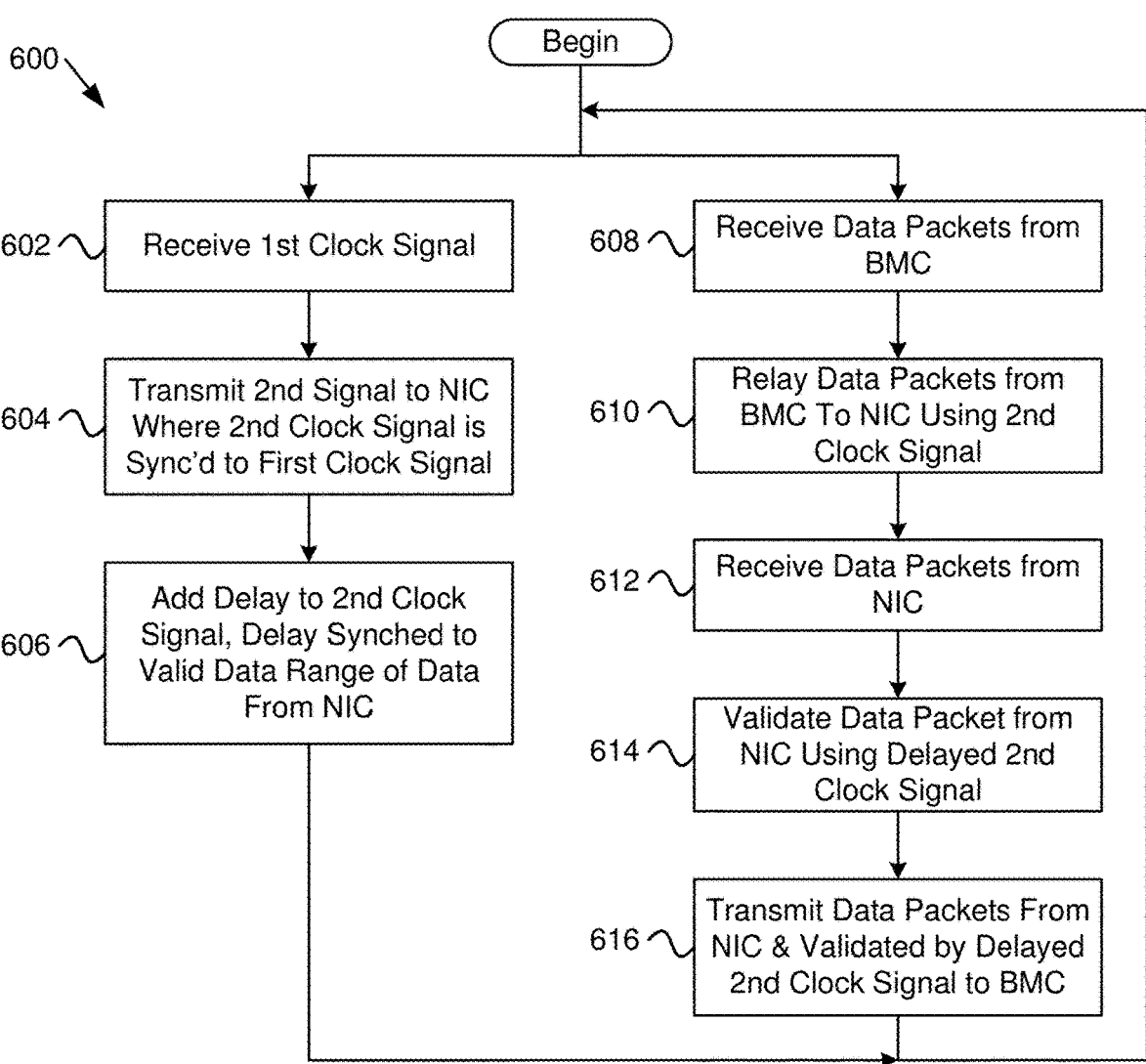

600

Begin

602 — Receive 1st Clock Signal

604 — Transmit 2nd Signal to NIC Where 2nd Clock Signal is Sync'd to First Clock Signal 606 — Add Delay to 2nd Clock Signal, Delay Synched to Valid Data Range of Data From NIC 608 — Receive Data Packets from BMC 610 — Relay Data Packets from BMC To NIC Using 2nd Clock Signal 612 — Receive Data Packets from NIC 614 — Validate Data Packet from NIC Using Delayed 2nd Clock Signal 616 — Transmit Data Packets From NIC & Validated by Delayed 2nd Clock Signal to BMC

FIG. 6

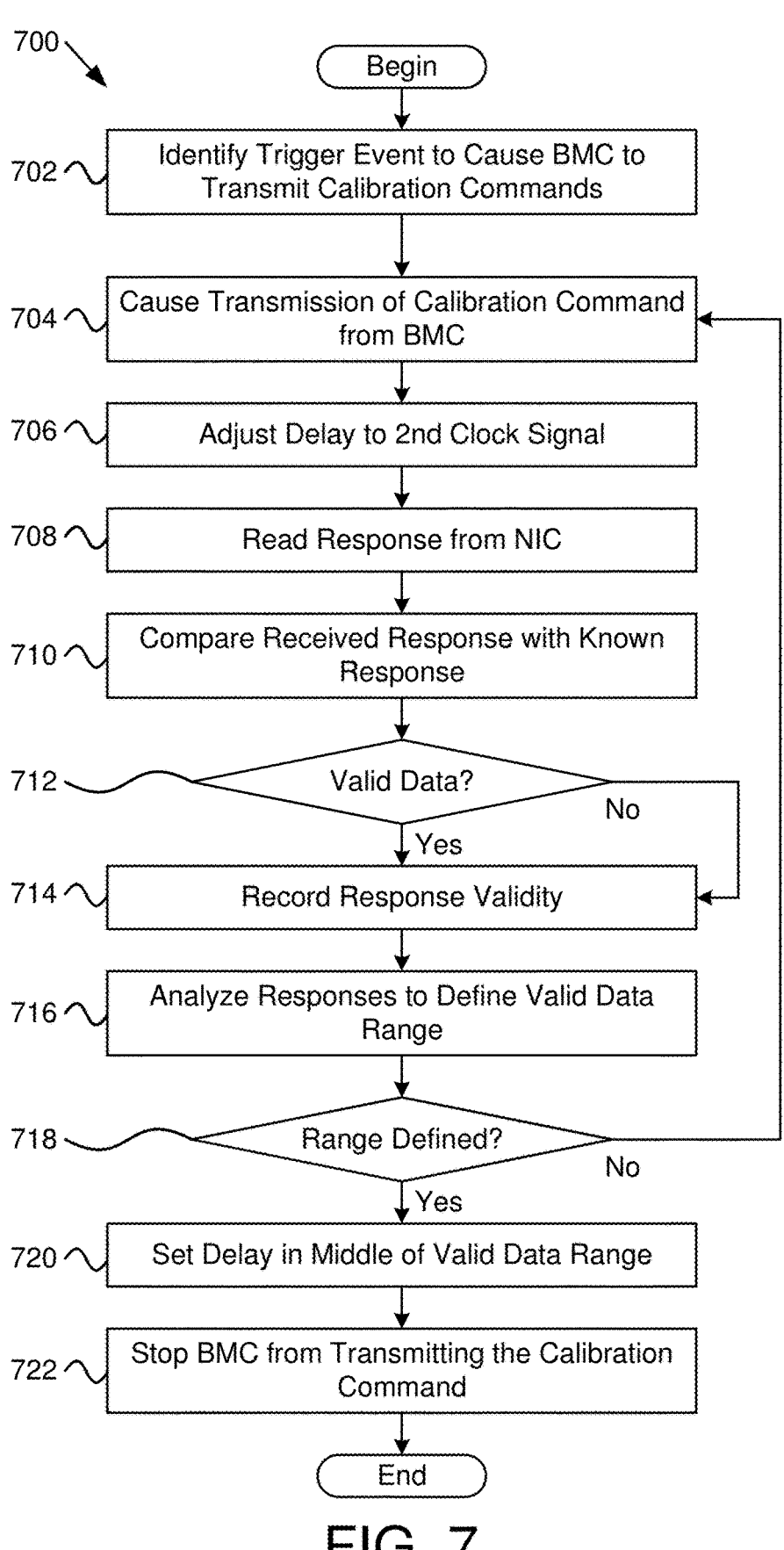

700

Begin

702 — Identify Trigger Event to Cause BMC to Transmit Calibration Commands

704 — Cause Transmission of Calibration Command from BMC

706 — Adjust Delay to 2nd Clock Signal

708 — Read Response from NIC

710 — Compare Received Response with Known Response

712 — Valid Data?
No
Yes

714 — Record Response Validity

716 — Analyze Responses to Define Valid Data Range

718 — Range Defined?
No
Yes

720 — Set Delay in Middle of Valid Data Range

722 — Stop BMC from Transmitting the Calibration Command

End

FIG. 7

NETWORK CONTROLLER SIDEBAND INTERFACE RETIMER

FIELD

The subject matter disclosed herein relates to extending a clock signal and more particularly relates to extending and synchronizing a clock signal for signals between a management controller and a network interface card.

BACKGROUND

In some architectures of computing devices that include a baseboard management controller ("BMC"), cabling from the BMC to a network interface card ("NIC") is long enough so that propagation delay affects data validity of communications between the BMC and the NIC.

BRIEF SUMMARY

An apparatus with a network controller sideband interface retimer is disclosed. A method and computing device also include the functions of the apparatus. The apparatus includes a second clock circuit configured to transmit a second clock signal to a NIC. The second clock signal is separate from a first clock signal from a clock connected to a BMC. The apparatus includes a NIC data relay circuit configured to receive data packets from the NIC on a first reduced media independent interface ("RMII") bus and to transmit the received data packets to the BMC over a second RMII bus. The apparatus includes a clock delay circuit configured to add a delay to the second clock signal to create a delayed second clock signal. The delay is adjusted to cause the delayed second clock signal to coincide with a time during receipt of the data packets received from the NIC when data of a bit of the data packets received from the NIC is valid.

A method includes transmitting a second clock signal to a NIC. The second clock signal is separate from a first clock signal from a clock connected to a BMC. The method includes receiving data packets from the NIC on a first RMII bus and adding a delay to the second clock signal to create a delayed second clock signal. The delay is adjusted to cause the delayed second clock signal to coincide with a time during receipt of the data packets received from the NIC when data of a bit of the data packets received from the NIC is valid. The method includes transmitting the received data packets to the BMC over a second RMII bus.

A computing device includes a processor, a NIC, a BMC, and a second clock circuit configured to transmit a second clock signal to the NIC. The second clock signal is separate from a first clock signal from a clock connected to the BMC. The computing device includes a NIC data relay circuit configured to receive data packets from the NIC on a RMII bus and to transmit the received data packets to the BMC over an RMII bus, and a clock delay circuit configured to add a delay to the second clock signal to create a delayed second clock signal. The delay is adjusted to cause the delayed second clock signal to coincide with a time during receipt of the data packets received from the NIC when data of a bit of the data packets received from the NIC is valid. The circuits include one or more of hardware circuits, a programmable hardware device, and code executable on a processor. The code is stored on one or more computer readable storage media.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a schematic flow chart diagram illustrating another method for a network controller sideband interface retimer, according to various embodiments; and FIG. 7 is a schematic flow chart diagram illustrating a method for calibrating a network controller sideband interface retimer, according to various embodiments.

DETAILED DESCRIPTION

Figure 1A:
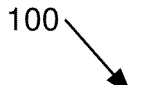
FIG. 1A is a schematic block diagram illustrating a system with a network controller sideband interface retimer, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

An apparatus with a network controller sideband interface retimer is disclosed. A method and computing device also include the functions of the apparatus. The apparatus includes a second clock circuit configured to transmit a second clock signal to a NIC. The second clock signal is separate from a first clock signal from a clock connected to a BMC. The apparatus includes a NIC data relay circuit configured to receive data packets from the NIC on a first reduced media independent interface ("RMII") bus and to transmit the received data packets to the BMC over a second RMII bus. The apparatus includes a clock delay circuit configured to add a delay to the second clock signal to create a delayed second clock signal. The delay is adjusted to cause the delayed second clock signal to coincide with a time during receipt of the data packets received from the NIC when data of a bit of the data packets received from the NIC is valid.

In some embodiments, the apparatus includes a delay calibration apparatus that includes a delay adjustment module configured to adjust the delay to the second clock signal over an adjustment range while reading known responses received from the NIC. Each known response from the NIC is received in response to the NIC receiving a plurality of identical calibration commands from the BMC. Each calibration command is configured to elicit the known response from the NIC. The delay calibration apparatus includes a response reader module configured to read each known response received from the NIC and to compare each of the received known responses to an expected response. The delay calibration apparatus includes a valid data module configured to determine an amount of delay associated with each received known response matching the expected response, and a delay setting module configured to set the delay of the delayed second clock signal to a value within a valid signal range of delay corresponding to received responses matching the expected response. The modules include one or more of hardware circuits, a programmable hardware device, and code executable on a processor. The code is stored on one or more computer readable storage media.

In other embodiments, the delay calibration apparatus includes a signal calibration module configured to cause the BMC repeatedly transmit the calibration command to the NIC, and a calibration termination module configured to cause the BMC to stop transmission of the calibration command to the NIC in response to the delay setting module setting the delay of the delayed second clock signal. In other embodiments, the delay calibration apparatus includes a delay calibration trigger module configured to direct the signal calibration module to cause the BMC to transmit the calibration command in response to a user command, a hardware testing procedure, a system reboot, a system power on event, and/or detecting installation and/or power on of the NIC, the BMC, and/or the apparatus. In other embodiments, the delay setting module sets the delay in a middle of the valid signal range.

In some embodiments, the second clock circuit is further configured to receive the first clock signal from a clock connected to the BMC and the second clock signal is synchronized with the first clock signal. In other embodiments, the RMII bus uses a network controller sideband interface ("NC-SI") protocol. In other embodiments, the apparatus includes a BMC data relay circuit configured to receive data packets from the BMC and to relay the received data packets from the BMC to the NIC. In other embodiments, the apparatus is configured on a card configured to insert into an open configuration project ("OCP") slot of a computing device comprising the BMC and the NIC.

In some embodiments, the delay is a first delay, the delayed second clock signal is a first delayed second clock signal, and the NIC is a first NIC. In the embodiments, the second clock circuit is further configured to transmit the second clock signal to a second NIC, the NIC data relay circuit is further configured to receive data packets from the second NIC on a third RMII bus, and the clock delay circuit is further configured to add a second delay to the second clock signal to create a second delayed clock signal. The second delay is adjusted to cause the second delayed clock signal to coincide with a time during receipt of data packets received from the second NIC when data of each bit of the data packets received from the second NIC is valid. In other embodiments, the clock delay circuit is further configured to add a third delay to the second clock signal to create a third delayed clock signal and the third delay is adjusted to cause the third delayed clock signal to coincide with a time during receipt of data packets from the BMC when data of each bit of the data packets received from the BMC is valid.

A method includes transmitting a second clock signal to a NIC. The second clock signal is separate from a first clock signal from a clock connected to a BMC. The method includes receiving data packets from the NIC on a first RMII bus and adding a delay to the second clock signal to create a delayed second clock signal. The delay is adjusted to cause the delayed second clock signal to coincide with a time during receipt of the data packets received from the NIC when data of a bit of the data packets received from the NIC is valid. The method includes transmitting the received data packets to the BMC over a second RMII bus.

In some embodiments, the method includes adjusting the delay to the second clock signal over an adjustment range while reading known responses received from the NIC. Each known response from the NIC is received in response to the NIC receiving a plurality of identical calibration commands from the BMC and each calibration command is configured to elicit the known response from the NIC. In the embodiments, the method includes reading each known response received from the NIC, comparing each of the received known responses to an expected response, determining an amount of delay associated with each received known response matching the expected response, and setting the delay of the delayed second clock signal to a value within a valid signal range of delay corresponding to received responses matching the expected response.

In some embodiments, the method includes causing the BMC to start repeatedly transmitting the calibration command to the NIC, and causing the BMC to stop transmission of the calibration command to the NIC in response to setting the delay of the delayed second clock signal. In other embodiments, causing the BMC to repeatedly transmit the calibration command to the NIC is in response to a user command, a hardware testing procedure, a system reboot, a system power on event, and/or detecting installation and/or power on of the NIC, the BMC, and/or a computing device comprising the BMC and NIC. In other embodiments, the RMII bus uses a NC-SI protocol. In other embodiments, the method includes, prior to transmitting the second clock signal, receiving the first clock signal from a clock connected to the BMC, synchronizing the second clock signal with the first clock signal, receiving data packets from the BMC, and relaying the received data packets from the BMC to the NIC. In other embodiments, an apparatus that includes the method is configured on a card configured to insert into an OCP slot of a computing device comprising the BMC and the NIC.

A computing device includes a processor, a NIC, a BMC, and a second clock circuit configured to transmit a second clock signal to the NIC. The second clock signal is separate from a first clock signal from a clock connected to the BMC. The computing device includes a NIC data relay circuit configured to receive data packets from the NIC on a RMII bus and to transmit the received data packets to the BMC over an RMII bus, and a clock delay circuit configured to add a delay to the second clock signal to create a delayed second clock signal. The delay is adjusted to cause the delayed second clock signal to coincide with a time during receipt of the data packets received from the NIC when data of a bit of the data packets received from the NIC is valid. The circuits include one or more of hardware circuits, a programmable hardware device, and code executable on a processor. The code is stored on one or more computer readable storage media.

In some embodiments, the computing device includes a delay calibration apparatus that includes a delay adjustment module configured to adjust the delay to the second clock signal over an adjustment range while reading known responses received from the NIC. Each known response from the NIC is received in response to the NIC receiving a plurality of identical calibration commands from the BMC and each calibration command is configured to elicit the known response from the NIC. The delay calibration apparatus includes a response reader module configured to read each known response received from the NIC and to compare each of the received known responses to an expected response, a valid data module configured to determine an amount of delay associated with each received known response matching the expected response, and a delay setting module configured to set the delay of the delayed second clock signal to a value within a valid signal range of delay corresponding to received responses matching the expected response. The modules include one or more of hardware circuits, a programmable hardware device, and/or code executable on a processor. The code is stored on one or more computer readable storage media.

In some embodiments, the RMII bus uses a NC-SI protocol. In other embodiments, an apparatus that includes the second clock circuit, the NIC data relay circuit, and the clock delay circuit are configured on a card configured to insert into an OCP slot of a computing device comprising the BMC and the NIC. In other embodiments, prior to transmitting the second clock signal, the second clock circuit is further configured to receive the first clock signal from a clock connected to the BMC and to synchronize the second clock signal with the first clock signal. In the embodiments, the computing device includes a BMC data relay circuit configured to receive data packets from the BMC and to relay the received data packets from the BMC to the NIC.

FIG. 1A is a schematic block diagram illustrating a system 100 with a network controller sideband interface retimer, according to various embodiments. The system 100 includes a network interface card ("NIC") retimer apparatus 102 on a retimer card 104 connected to a motherboard 106 of a computing device 108. The computing device 108 includes a baseboard management controller 110, a clock 112, an open configuration project ("OCP") slot 114, a NIC 116, a central processing unit ("CPU") 118, memory 120, and non-volatile data storage 122, which are described below.

Many computing devices 108, such as rack-mounted servers, blade computers, and the like that reside in data-centers often include a BMC 110, which is typically mounted on the motherboard 106. Typically, a BMC 110 provides a way to remotely manage the computing device 108 via a management network (not shown). Via the management network, a system administrator is able to monitor physical functions of the computing device 108, such as fan speed, temperature, processor utilization, memory usage, and other metrics helpful in managing the computing device 108. In addition, the BMC 110 is typically able to startup and shut down the computing device 108 and is able to update operating systems, firmware, application, and the like. Typically, the BMC 110 is connected over the management network to a management server (not shown), which may be connected to a remote server over a management network that is separate from the computer network connecting clients (not shown) to the computing device 108. In some embodiments, the management server is an XClarity®

Administrator ("XCA") and the remote server is an XClarity Orchestrator ("XCO") or XCA. The XCA and the XCO are both by Lenovo®.

"BMC" is typically a generic term for a service processor or management controller in a computing device and BMCs are supplied by various computing equipment manufacturers. Examples of a BMC 110 include an Xclarity® Controller ("XCC") by Lenovo®, an Intel® AMT (Active Management Technology), or a controller with similar functionality. In some embodiments, the BMC 110 complies with a specification for a Datacenter-ready Secure Control Module ("DC-SCM"). The BMC 110 typically runs various BMC services. The BMC services are typically applications running on a processor of the BMC 110 and are typically intended to allow management of the computing device 108 though the BMC 110. In some examples, a BMC service may include an application that receives and initiates a firmware update on the BMC 110. One of skill in the art will recognize other functions and services of the BMC 110.

The network interface card ("NIC") 116 is an interface between the motherboard 106 and associated devices, like the CPU 118, memory 120, non-volatile data storage 122, etc. to external networks, such as a LAN, a WAN, a fiber network a wireless connection, and the like. In some embodiments, the NIC 116 includes a sideband that uses a reduced media independent interface ("RMII"). RMII is a standard which was developed to reduce the number of signals required to connect a physical layer ("PHY") to a medium access control ("MAC") layer. Reducing pin count reduces cost and complexity for network hardware especially in the context of microcontrollers with built-in MAC, FPGAs, multiport switches or repeaters, and/or motherboard chipsets. The changes resulted in RMII using about half the number of signals compared to a media independent interface ("MII"). In some embodiments, the RMII uses the Network Controller Sideband Interface ("NC-SI") that complies with a Distributed Management Task Force ("DMTF") specification. NC-SI is an electrical interface and protocol defined by the DMTF. The NC-SI enables the connection of the BMC 110 to one or more NICs 116 in a server computer system (e.g., computing device 108) for the purpose of enabling out-of-band system management. This allows the BMC 110 to use the network connections of the ports of the NIC 116 for the management traffic, in addition to the regular host traffic.

Typically, the BMC 110 is connected to the NIC 116 to allow communication between the BMC 110 and the NIC 116. Typically, a clock 112 is connected to both the BMC 110 and the NIC 116 that provides a common clock signal. Among other functions, the common clock signal is used to validate data. For example, data lines switch from 0 to 1 and from 1 to 0. During transitions between a logic high (a "1") and a logic low (a "0"), voltage transitions take an amount of time. In addition, a command sent from the BMC 110 to the NIC 116 that elicits a response from the NIC 116, that is then received at the BMC 110. Propagation delay caused by a time for data to travel from the NIC 116 and a time for data to travel from the NIC 116 to the BMC 110 is also taken into account. Once transition periods, propagation delay, etc. have passed, the common clock signal is used to "clock in" data to record the bit values of each data line. Where the clock signal falls in a time period when data has not stabilized on the data lines, incorrect data may be logged.

Where a common clock signal is used, conductors, traces, etc. connecting the BMC 110 to the NIC 116 may be long enough so that propagation delay associated with transmission of data packets between the BMC 110 and the NIC 116 may affect validity of data packets transmitted between the BMC 110 and the NIC 116. Every inch added to the data pathway between the BMC 110 and the NIC 116 adds two inches towards a timing budget. The timing budget takes into account setup time, propagation delay, etc. to find a hold time where data on the data lines is valid. The hold time is a time when a data line is holding steady between when data line has had enough time to transition from 1 to 0 or from 0 to 1 and takes into account propagation delay and other factors. As the length of the data pathways between the BMC 110 and the NIC 116 grows, the hold time decreases. Currently, data pathways between the BMC 110 and the NIC 116 may be on the order of 12-18 inches (about 30-46 centimeters).

The NIC retimer apparatus 102 provides a way to decouple clock signals used for commands from the BMC 110 to the NIC 116 and responses from the NIC 116 to the BMC 110. In some embodiments, the NIC retimer apparatus 102 receives a first clock signal ("Clk-1") from the clock 112 and transmits a second clock signal ("Clk-2") that is synchronized to the first clock signal Clk-1 to the NIC 116. In other embodiments, the NIC retimer apparatus 102 receives a clock signal from a second clock separate from the clock 112 connected to the BMC 110 and transmits the second clock signal Clk-2 based on the second clock (see FIG. 4C). The NIC retimer apparatus 102 receives data packets from the NIC 116 and retransmits the data packets to the BMC 110. The NIC retimer apparatus 102 also adds a delay to the second clock signal Clk-2 to create a delayed second clock signal used to validate data of the data packets received from the NIC 116. The delay is adjusted to cause the delayed second clock signal to coincide with a with a time during receipt of the data packets received from the NIC 116 when data of each bit of the data packets received from the NIC 116 is valid. The NIC retimer apparatus 102 is discussed in more detail below.

The NIC retimer apparatus 102 includes a network controller sideband interface retimer, in some embodiments, is implemented using an FPGA. In other embodiments, the NIC retimer apparatus 102 is implemented using an application specific integrated circuit ("ASIC"). In other embodiments, the NIC retimer apparatus 102 is implemented using discrete hardware circuits. In some embodiments, the NIC retimer apparatus 102 is implemented on a printed circuit board as a retimer card 104. In other embodiments, the retimer card is configured to insert into an OCP slot 114. In other embodiments, the NIC retimer apparatus 102 is implemented on a motherboard 106. In some embodiments, the NIC retimer apparatus 102 is implemented on an FPGA on the motherboard 106. One of skill in the art will recognize other ways to implement the NIC retimer apparatus 102.

The OCP slot 114 provides an alternate way to provide a network connection separate from a NIC 116 connected to a Peripheral Component Interconnect Express ("PCIe") bus or other high-speed connection. The OCP slot 114, in some embodiments, is configured to connect to a NIC implemented on an OCP card. In other embodiments, the OCP slot 114 is configured to be used for other devices on an OCP card. In embodiments where the NIC retimer apparatus 102 is implemented on a retimer card 104 configured for an OCP slot 114, the OCP slot 114 is connected to the BMC 110 and the clock 112 via connections between the OCP slot 114 and the motherboard 106 and traces on the motherboard 106. Using the OCP slot 114 for the NIC retimer apparatus 102 and retimer card 104 provides a convenient way to access signals and data from the BMC 110 and the clock 112.

The motherboard 106 is a printed circuit board that is typically the connection point for a CPU 118, memory 120, internal non-volatile data storage 122, graphical processing units ("GPUs"), and other critical components of a computing device 108. Typically, the motherboard 106 includes various slots and sockets, such as slots for memory 120, a socket for one or more CPUs 118, a slot for non-volatile data storage 122, slots for PCIe devices, and the like. One of skill in the art will recognize other features of a motherboard 106 of a computing device 108.

The motherboard 106 is connected to a NIC 116. In other embodiments, the motherboard 106 is connected to two or more NICs 116. A NIC 116 provides a connection to an external network, such as a LAN, a WAN, a fiber network, or the like. Typically, the computing device 108 services workloads of applications, which require connection to other devices via a network that is accessible over the NIC 116. In some embodiments, the computing device 108 is a server in a cloud computing environment where the server is connected to clients via the NIC 116. The BMC 110 typically communicates with the NIC 116 and other devices of the motherboard 106 for control and monitoring. The NIC 116 typically includes one or more network jacks compatible with various communication cable types, such as passive copper cables, active copper cables (structures cables), fiber optic cables, and the like.

Figure 1A:
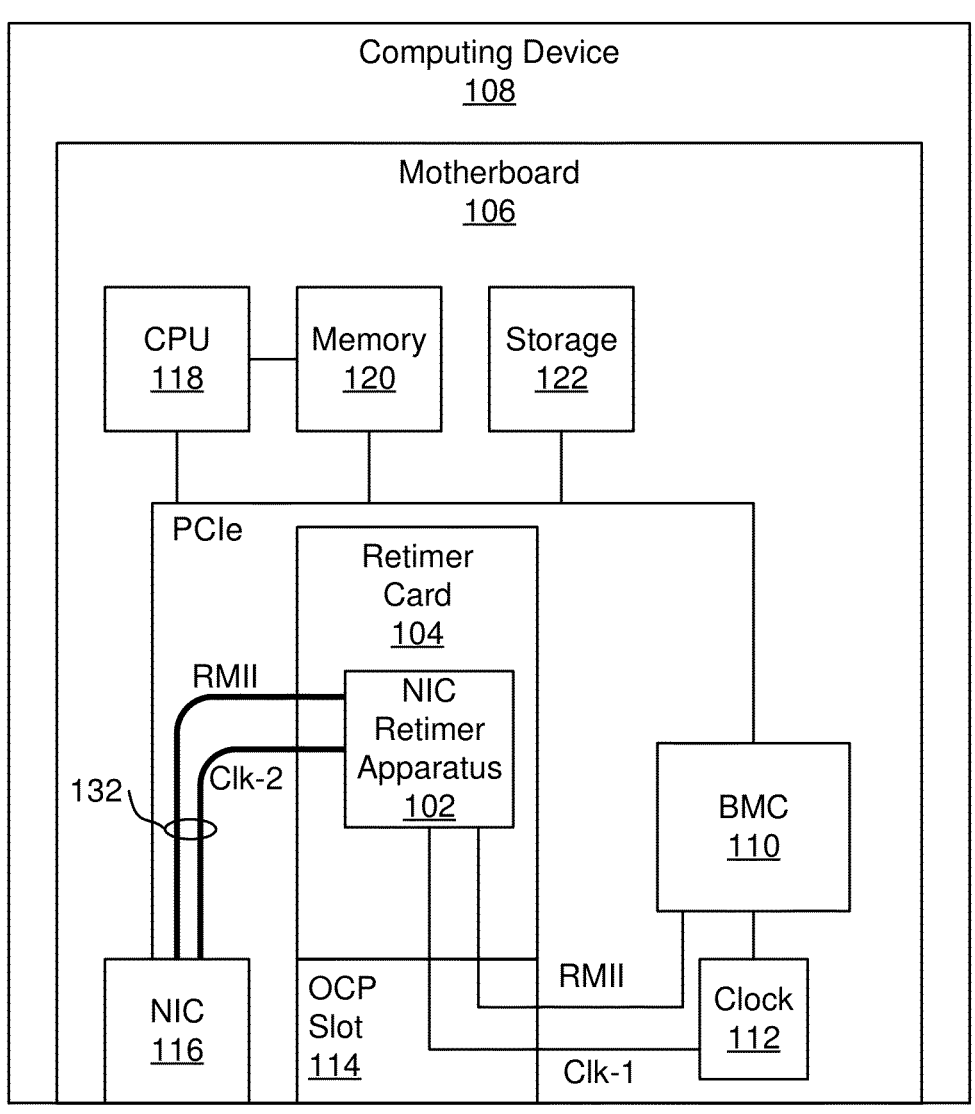
Figure 1B:
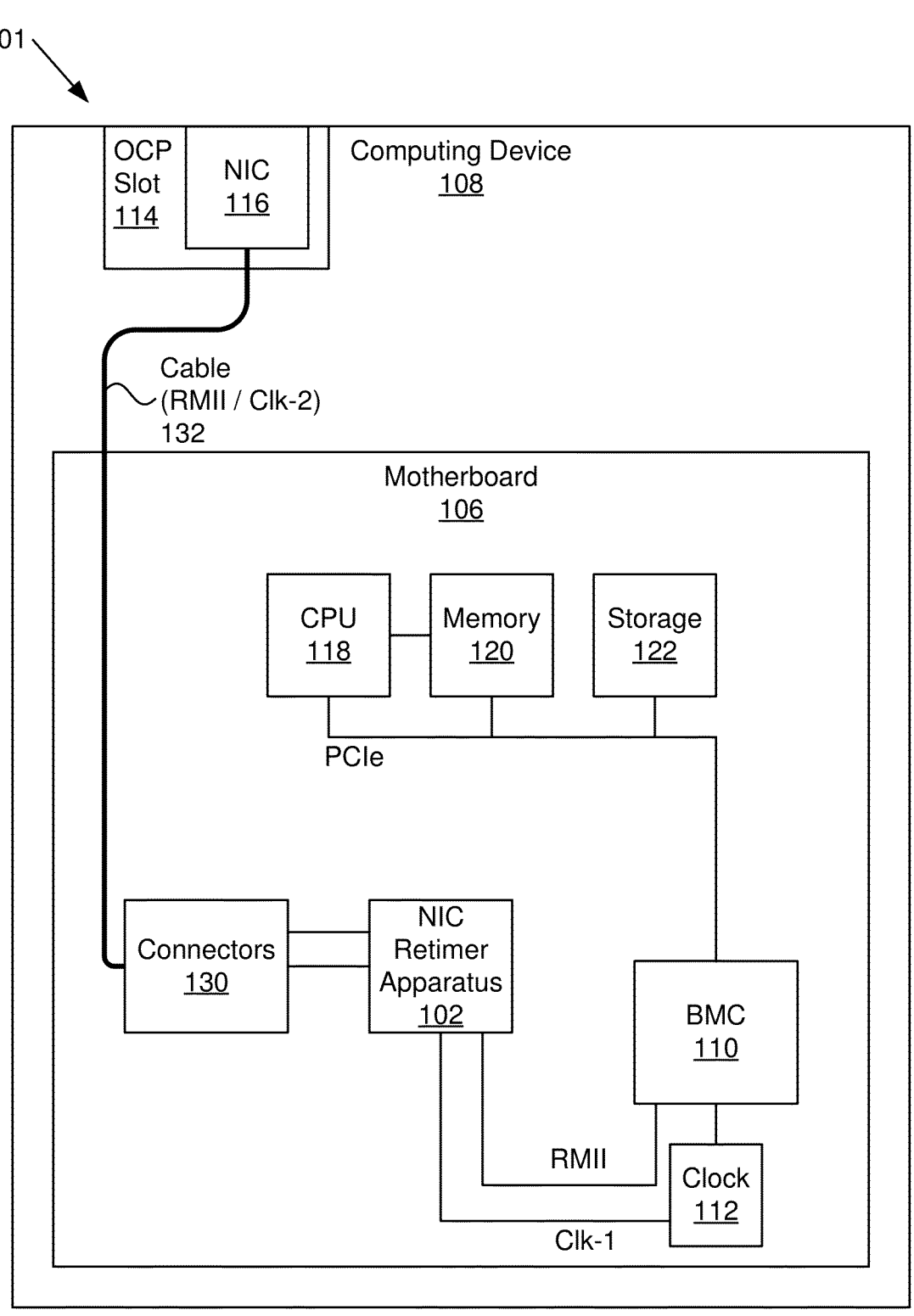
FIG. 1B is a schematic block diagram illustrating a system with a network controller sideband interface retimer and a NIC in an open configuration project ("OCP") slot, according to various embodiments.

FIG. 1B is a schematic block diagram illustrating a system 101 with a network controller sideband interface retimer and a NIC 116 in an OCP slot 114, according to various embodiments. The system 101 includes a NIC retimer apparatus 102 on a motherboard 106 where the NIC retimer apparatus 102 is connected to connectors 130. The computing device 108 includes an OCP slot 114 with a NIC 116. A cable 132 connects the NIC 116 to the NIC retimer apparatus 102 via the connectors 130. The system 101 of FIG. 1B offers an alternative topology to the system 100 of FIG. 1A where the NIC 116 is in an OCP slot 114. In some embodiments, a second NIC (not shown) is also installed in an OCP slot 114. The NIC retimer apparatus 102 operates substantially the same as the NIC retimer apparatus 102 of the system 100 of FIG. 1.

Figure 2:
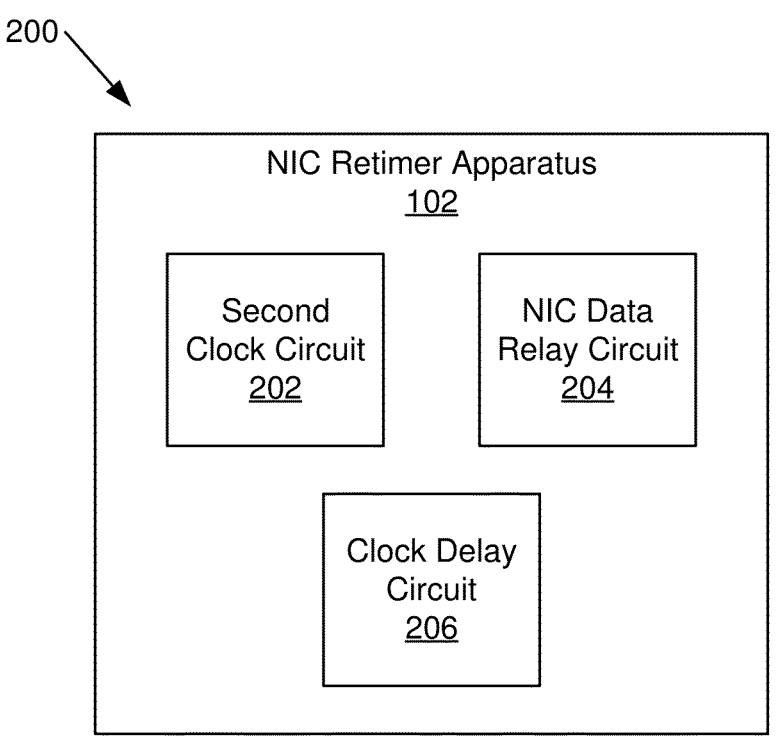
FIG. 2 is a schematic block diagram illustrating an apparatus for a network controller sideband interface retimer, according to various embodiments.

FIG. 2 is a schematic block diagram illustrating an apparatus 200 for a network controller sideband interface retimer, according to various embodiments. The apparatus 200 includes a NIC retimer apparatus 102 with a second clock circuit 202, a NIC data relay circuit 204, and a clock delay circuit 206, which are described below. In some embodiments, the apparatus 200 includes the NIC retimer apparatus 102 on a retimer card 104. In some embodiments, some or all of the apparatus 200 is implemented using hardware circuits and/or a programmable hardware device, such as an FPGA. In other embodiments, at least a portion of the apparatus 200 is implemented using code executable by a processor where the code is stored on a computer readable storage media, which is non-transitory.

The apparatus 200 includes a second clock circuit 202 configured to transmit a second clock signal Clk-2 to a NIC 116. The second clock signal is separate from a first clock signal Clk-1 from the clock 112 connected to a BMC 110. In some embodiments, the first clock signal Clk-1 and the second clock signal Clk-2 are not synchronized. In some embodiments, the second clock circuit 202 is configured to receive the first clock signal Clk-2 from the clock 112 connected to the BMC 110 and to synchronize the second clock circuit Clk-2 to the first clock signal Clk-1 before transmission to the NIC 116. In some embodiments, the second clock circuit 202 transmits the second clock signal Clk-2 to more than one NIC 116, as depicted in FIGS. 4A, 4B, 4C, and 4D.

The apparatus 200 includes a NIC data relay circuit 204 configured to receive data packets from the NIC 116 on a first reduced media independent interface ("RMII") bus and to transmit the received data packets to the BMC 110 over a second RMII bus. In some embodiments, the data packets transmitted to the BMC 110 from the NIC 116 are in response to commands transmitted from the BMC 110 to the NIC 116. In other embodiments, the NIC 116 transmits data to the BMC 110 independent of a BMC 110 command. In some embodiments, the NIC data relay circuit 204 includes flip-flops, a first in first out ("FIFO"), a multiplexer ("MUX"), or the like, as explained below in relation to FIGS. 4A-4D.

The apparatus 200 includes a clock delay circuit 206 configured to add a delay to the second clock signal Clk-2 to create a delayed second clock signal Clk-2OS. The delay is adjusted to cause the delayed second clock signal Clk-2OS to coincide with a time during receipt of the data packets received from the NIC 116 when data of each bit of the data packets received from the NIC 116 is valid. The delay inserted by the clock delay circuit 206 is intended to occur after data transitioning between a 1 and a 0 (e.g., high to low) or between a 0 and a 1 (low to high) has settled and the data is valid.

During a data transition, various factors affect a setup time, which is an amount of time from a start of a data transition until the data is at a low or high level and is ready to be read. Some of the delay is due to speed of a transition from low to high or high to low, part variations, and the like. Propagation delay is an amount of delay caused due to time delay caused as a signal input at one end of a conductor and then received at an opposite end of the conductor. The longer the conductor, the more that propagation delay grows. Once the setup time has concluded, a time while the data is valid is a hold time before a next clock cycle and the data is allowed to change. Clock speed increases affect holdup time. While devices may be improved to reduce setup time in terms of basic switching speed, output skew, and other factors affecting setup time, propagation delay due to conductor length may still affect holdup time. In some instances, conductor length may be long enough to minimize or eliminate holdup time without introduction of a time delay.

In some embodiments, the delay added to the second clock signal Clk-2 is chosen so that the delayed second clock signal Clk-2OS falls somewhere during holdup time of the data received from the NIC 116. In other embodiments, the delay added to the second clock signal Clk-2 is chosen to be a particular time after setup time for data from the NIC 116 has concluded. In other embodiments, the delay added to the second clock signal Clk-2 is chosen to be centered in a holdup time range.

The clock delay circuit 206 is designed to provide an adequate amount of delay to the delayed second clock signal Clk-2OS to allow a wider range of conductor lengths. In some embodiments, the delay added to the second clock signal Clk-2 by the clock delay circuit 206 is set so that data from the NIC 116 is clocked in while the data from the NIC 116 is valid. Thus, the clock delay circuit 206 allows for varied length in cables and traces between the NIC retimer apparatus 102 and the NIC 116. In some embodiments, the clock delay circuit 206 adds delay to the second clock signal Clk-2 so that the delayed second clock signal Clk-2OS in a middle of a valid signal range.

Figure 3:
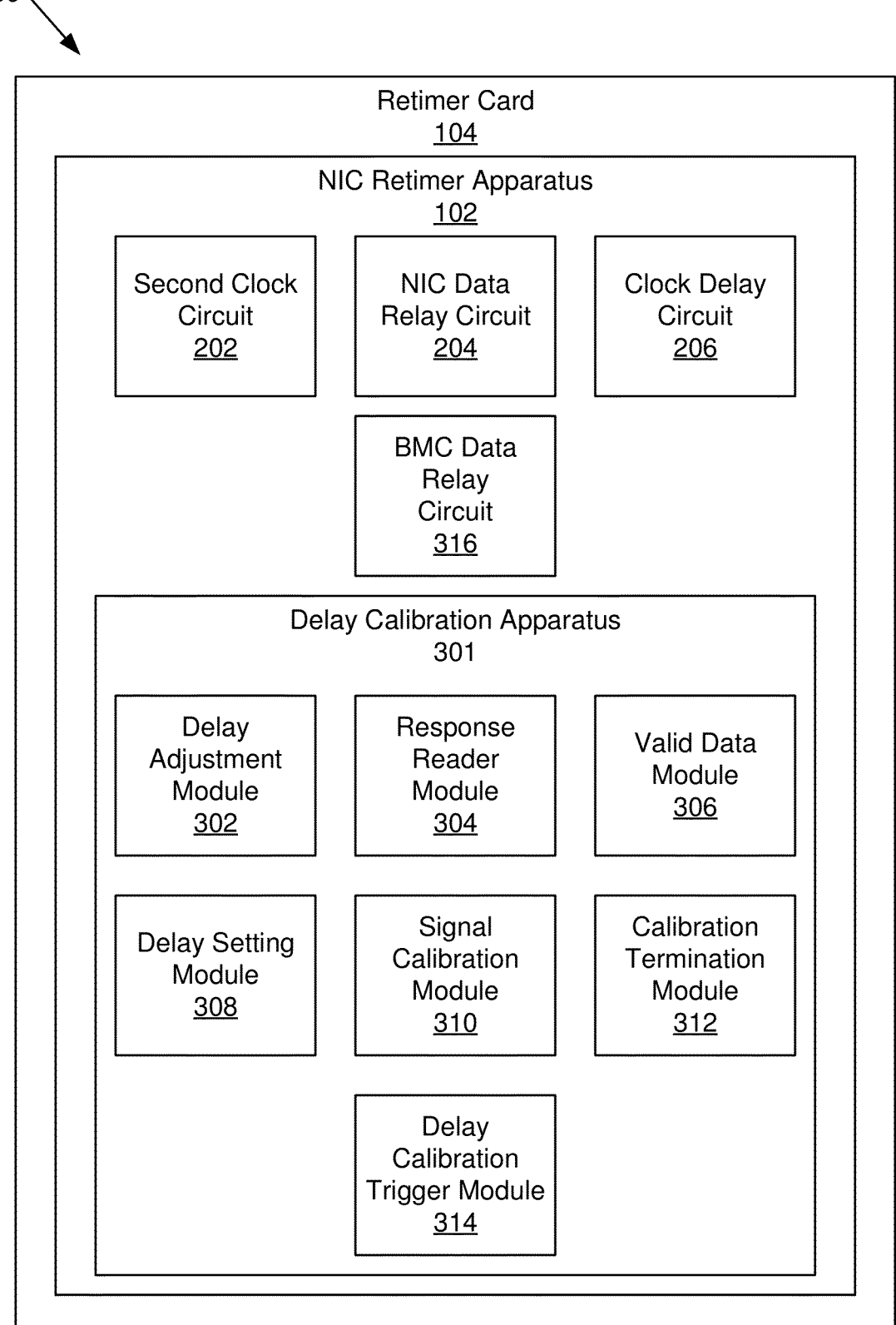
FIG. 3 is a schematic block diagram illustrating another apparatus for a network controller sideband interface retimer, according to various embodiments.

FIG. 3 is a schematic block diagram illustrating another apparatus 300 for a network controller sideband interface retimer, according to various embodiments. The apparatus 300 includes a NIC retimer apparatus 102 with a second clock circuit 202, a NIC data relay circuit 204, and a clock delay circuit 206, which are substantially similar to those described in relation to the apparatus 200 of FIG. 2. In various embodiments, the apparatus 300 includes a BMC data relay circuit 316 and a delay calibration apparatus 301 with a delay adjustment module 302, a response reader module 304, a valid data module 306, a delay setting module 308, a signal calibration module 310, a calibration termination module 312, and/or a delay calibration trigger module 314, which are described below. In various embodiments, the apparatus 300 is implemented similar to the apparatus 200 of FIG. 2.

In some embodiments, the apparatus 300 includes a BMC data relay circuit 316 configured to receive data packets from the BMC 110 and to relay the received data packets from the BMC to the NIC 116. Typically, data packets transmitted from the BMC 110 to the NIC 116 synchronized with the first clock signal Clk-1. In some embodiments, the BMC data relay circuit 316 transmits the data packets received from the BMC 110 synchronized with the second clock signal Clk-2. In other embodiments, the second clock signal Clk-2 is synchronized with the first clock signal Clk-1 so that the data packets received from the BMC 110 and transmitted to the NIC 116 by the BMC data relay circuit 316 are synchronized with the first clock signal Clk-1 and the second clock signal Clk-2.

In some embodiments, the apparatus 300 includes a delay calibration apparatus 301 with a delay adjustment module 302 configured to adjust the delay to the second clock signal Clk-2 over an adjustment range while reading known responses received from the NIC 116. Each known response from the NIC 116 is received in response to the NIC 116 receiving a plurality of identical a calibration commands from the BMC 110. In some embodiments, the calibration commands from the BMC 110 invoke a known response from the NIC 116. Data received from the NIC 116 may then be read and compared to the known response to determine if delay added by the clock delay circuit 206 is adequate.

The adjustment range is based on a length of a clock cycle of the second clock signal Clk-2. For example, where the second clock signal Clk-2 is 50 mega Hertz ("mHz"), the clock period is 20 nanoseconds ("nS"). The adjustment range, in the example, would have a maximum limit of 20 nS. Where the second clock signal Clk-2 is 50 mHz, the delay adjustment module 302 may adjust the delay to the second clock signal Clk-2 from 0 to 20 nS. In some embodiments, the delay adjustment module 302 includes reasonable increments sized based on the period of the second clock signal Clk-2. In some examples, the delay adjustment module 302 may divide the clock period into a certain number of segments, such as 10 segments, 20 segments, etc. Where the clock period for the second clock signal Clk-2 is 10 segments and the clock period is 20 nS, the delay adjustment module 302 may vary the delay from 0 to 20 nS in 2 nS increments. The purpose of adjusting the delay is to find edges of the holdup time by determining what delay amounts data from the NIC 116 is valid for a particular cable length between the NIC 116 and the NIC retimer apparatus 102.

In some embodiments, the delay adjustment module 302 selects an adjustment range smaller than the clock period of the second clock signal Clk-2 to allow for known delays in the setup time. For example, if an output skew, switching time, etc. amount to 4 nS for a 50 mHz clock frequency, the adjustment range may be between 4 nS and 20 nS. One of skill in the art will recognize an appropriate adjustment range for a particular second clock signal Clk-2 frequency and/or know hardware parameters.

In some embodiments, the delay adjustment module 302 changes the delay after every data packet from the NIC 116 while the BMC 110 is transmitting a repeated calibration command. In other embodiments, the delay adjustment module 302 changes the delay after an amount of time while the BMC 110 is transmitting a repeated calibration command. In other embodiments, the delay adjustment module 302 changes the delay after an amount of received bits while the BMC 110 is transmitting a repeated calibration command.

In some embodiments, the apparatus 300 includes a response reader module 304 configured to read each known response received from the NIC 116 and to compare each of the received known responses to an expected response and a valid data module 306 configured to determine an amount of delay associated with each received known response matching the expected response. In some embodiments, the response reader module 304 and/or the valid data module 306 coordinate with the delay adjustment module 302 to know how much delay is inserted by the delay adjustment module 302 and/or when the delay adjustment module 302 changes the amount of delay. In some examples, the delay adjustment module 302 inserts a particular amount of delay, such as 2 nS, the response reader module 304 reads the responses from the NIC 116 and the valid data module 306 compares the known response to the responses from the NIC 116 to the known response and records the amount of delay and whether or not the known response matches the received response from the NIC 116.

In some embodiments, the valid data module 306 determines how many of the responses match the known response. For example, if the delay is 2 nS and 6 responses do not match, the valid data module 306 may enter the 2 nS delay and a 6 in a line in a table. In other embodiments, the valid data module 306 records a "match" where a particular number of matches exceeds a match threshold and a "non-match" where the number of matches is below the match threshold. In some embodiments, the delay adjustment module 302, the response reader module 304, and the valid data module 306 coordinate to record matches and non-matches for each delay increment. In some embodiments, the valid data module 306 determines from the recorded data, a valid signal range. In some embodiments, the valid signal range corresponds to the holdup time for the data received from the NIC 116.

In some embodiments, the apparatus 300 includes a delay setting module 308 configured to set the delay of the delayed second clock signal Clk-2OS to a value within the valid signal range of delay corresponding to received responses matching the expected response. In some embodiments, the delay setting module 308 sets the delay in the middle of the valid signal range. For example, where the valid signal range is between 4 nS and 18 nS, a width of the valid signal range is 14 nS so the delay setting module 308 may set the delay to 4+7=11 nS. In other embodiments, the delay setting module 308 sets the delay to a particular amount of time after a start of the valid signal range. For example, if the valid signal range is between 4 nS and 18 nS, the delay setting module 308 may set the delay to 4 nS after the start of the valid signal range at 8 nS. One of skill in the art will recognize other ways for the valid data module 306 to determine the valid signal range and for the delay setting module 308 to set the delay to the second clock signal Clk-2 to fall within the valid signal range (e.g., within the holdup time) of the data received from the NIC 116.

In some embodiments, the apparatus 300 includes a signal calibration module 310 configured to cause the BMC 110 repeatedly transmit the calibration command to the NIC 116. In some embodiments, the signal calibration module 310 sends a command to the BMC 110 that causes the BMC 110 to start repeatedly sending the calibration command.

In some embodiments, the apparatus 300 includes a calibration termination module 312 configured to cause the BMC 110 to stop transmission of the calibration command to the NIC 116 in response to the delay setting module 308 setting the delay of the delayed second clock signal Clk-2OS. In some embodiments, the calibration termination module 312 sends a command to the BMC 110 to cease transmission of the calibration command. In some embodiments, the calibration termination module 312 causes the BMC 110 to stop transmission of the calibration command after a particular time period, at the expiration of a time limit, etc. In some embodiments, the calibration termination module 312 starts a timer when the signal calibration module 310 causes the BMC 110 to start transmission of the calibration command and causes the BMC 110 to stop transmission of the calibration command at the earlier of the delay setting module 308 setting the delay for the delayed second clock signal Clk-2OS or the expiration of the timer.

In some embodiments, the apparatus 300 includes a delay calibration trigger module 314 configured to direct the signal calibration module 310 to cause the BMC 110 to transmit the calibration command in response to a triggering event. In various embodiments, the triggering event includes a user command, a hardware testing procedure, a system reboot, a system power on event, and/or detecting installation and/or power on of the NIC 116, the BMC 110, and/or the NIC retimer apparatus 102. In some embodiments, the delay calibration trigger module 314 is programmable to allow a user to select one or more triggering events.

Figure 4A:
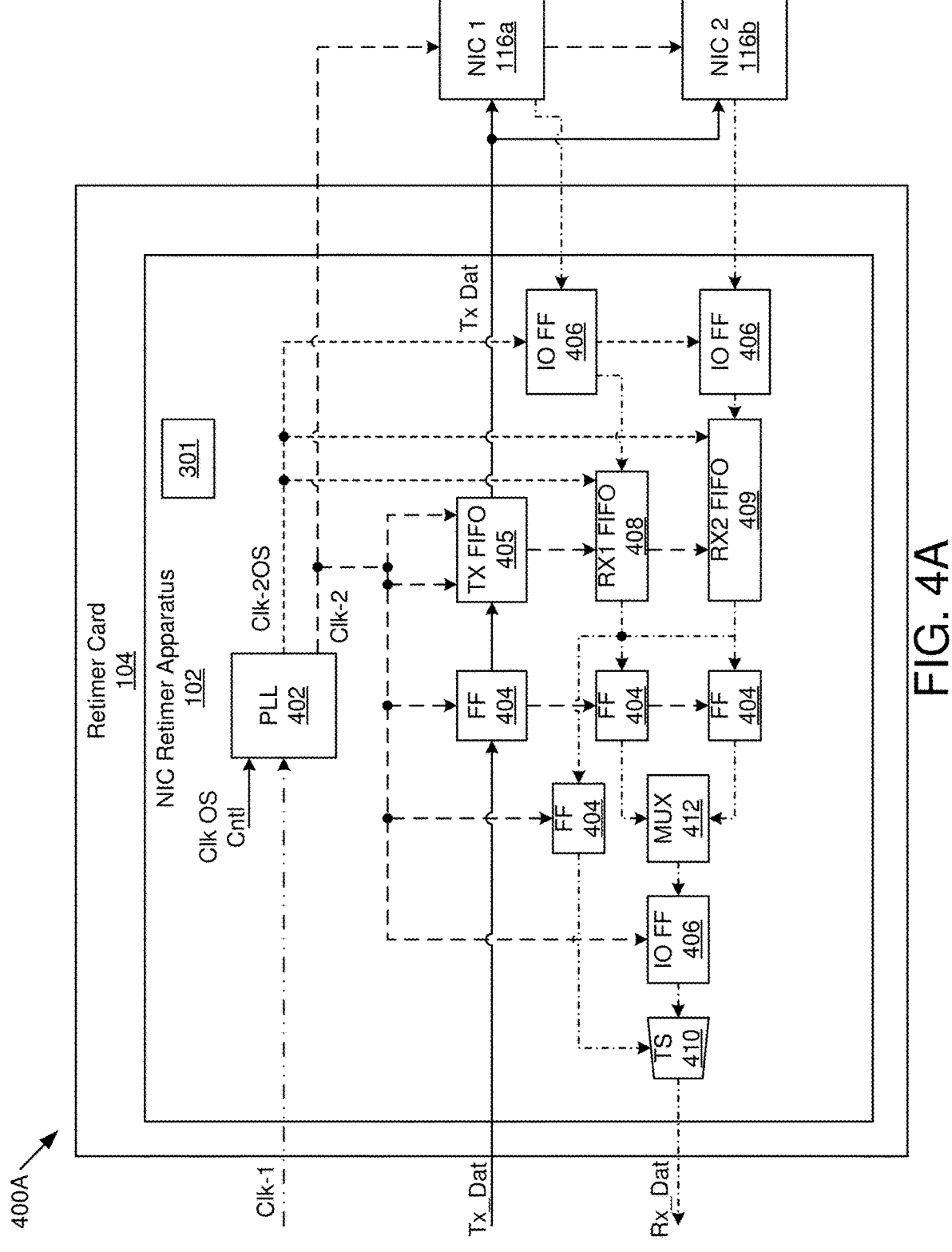
FIG. 4A is a schematic block diagram illustrating a circuit for a network controller sideband interface retimer, according to various embodiments.

FIG. 4A is a schematic block diagram illustrating a circuit 400A for a network controller sideband interface retimer. The circuit 400A includes a NIC retimer apparatus 102 in a retimer card 104 feeding two NICs: NIC 1 116a and NIC 2 116b. A BMC 110 would be connected to the left side of the circuit 400A. A first clock signal Clk-1 and a data transmit line TX_Dat for data packets from the BMC 110 and a data receive line RX_Dat are configured to be connected to a BMC 110.

The first clock signal Clk-1 is input to a phase lock loop ("PLL") 402, which has an output of the second clock signal Clk-2 and the delayed second clock signal Clk-2OS. In some embodiments, the PLL 402 is controlled to adjust the delay added to the second clock signal Clk-2, for example, by the delay setting module 308. The NIC retimer apparatus 102 includes various flip-flops ("FF") 404 and input/output ("IO") flip-flops 406, which are used to clock in data from the BMC 110 and the NICs 116. First-in-first-out ("FIFO") devices are used to provide a buffer between the BMC 110 and NICs 116. The TX FIFO 405 services the transmit line TX_Dat while data packets from the NICs 116 utilize RX1 FIFO 408 and RX2 FIFO 409.

The data packets received from the two NICs 116 are combined into a single receive line RX_Dat via a MUX 412, which allows selection of the NIC (116a or 116b) that is transmitting or is transmitting first. Computing devices with an OCP slot 114 typically include multiple slots and a NC-SI bus typically is capable of supporting multiple devices so the circuit 400A includes a tri-state output 410. The tri-state output 410 is able to be high, low, or high impedance. In the high impedance state, the tri-state output 410 allows other devices to control the RX_Dat line. The data pathways, including the TX_Dat and the RX_Dat lines are RMII busses. In some embodiments, the data pathways, including the TX_Dat and the RX_Dat lines use the NC-SI protocol.

The clock lines provide flexibility needed to varying length cables between the NIC retimer apparatus 102 and the NICs 116. Note that the IO FFs 406, RX1 FIFO 408, and RX2 FIFO 409 are connected to the delayed second clock signal Clk-2OS to allow for varying lengths of cable to the NICs 116.

In some embodiments, the second clock circuit 202 is implemented using at least the PLL 402. In some embodiments, the NIC data relay circuit 204 is implemented using the components depicted as receiving and processing the data packets from the NICs 116 and transmission on the RX_Dat line, including the IO FFs 406, RX1 FIFO 408, RX2 FIFO 409, FFs 404, MUX 412, and TS 410. The clock delay circuit 206 is implemented, in some embodiments, using the PLL 402 with a delay set to offset the delayed second clock signal Clk-2OS from the second clock signal Clk-2. In some embodiments, the BMC data relay circuit 316 is implemented using the devices connected to the TX_Dat line, including FF 404 and TX FIFO 405.

Figure 4B:
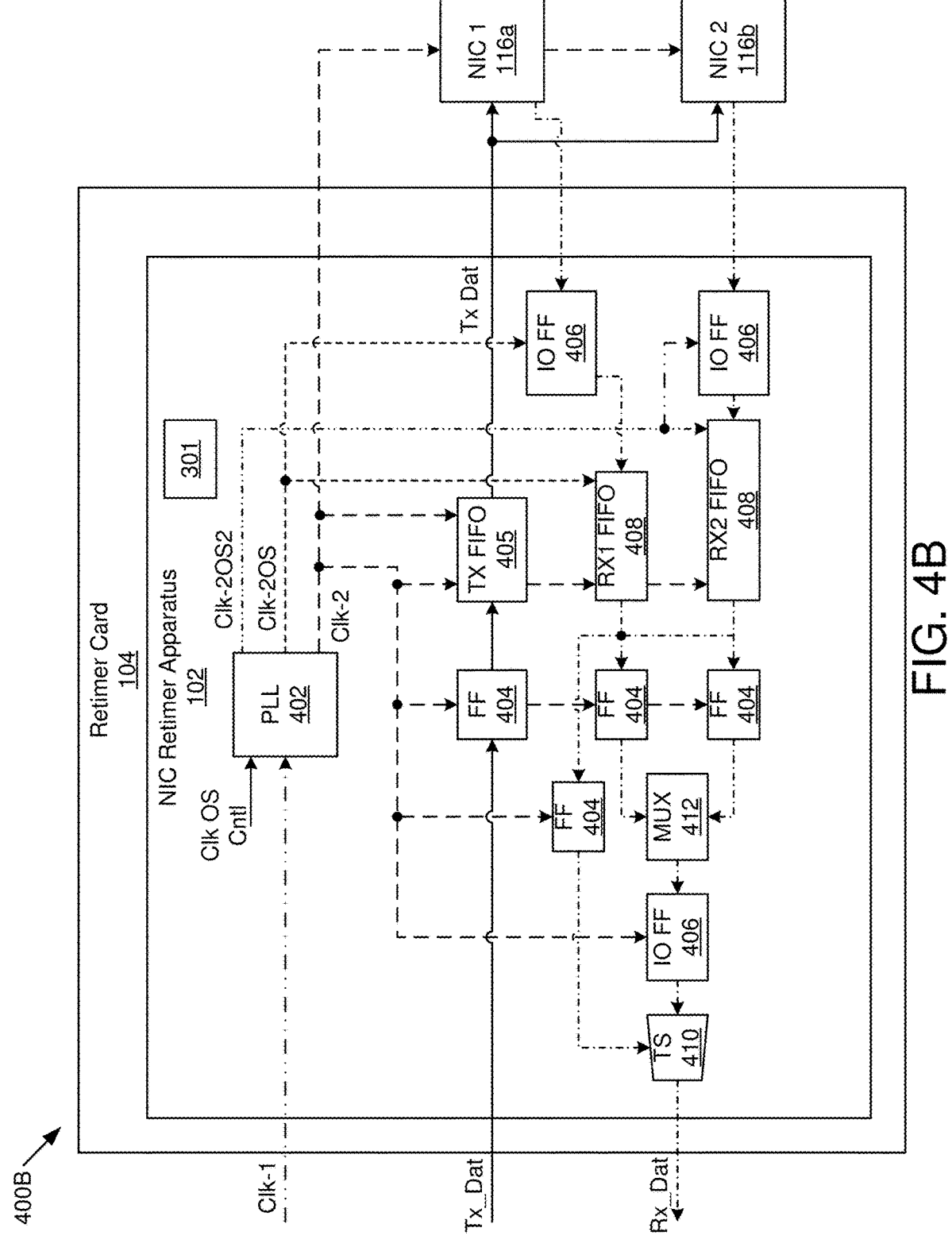
FIG. 4B is a schematic block diagram illustrating a circuit for a network controller sideband interface retimer for two NICs connected with cables of different lengths, according to various embodiments.

FIG. 4B is a schematic block diagram illustrating a circuit 400B for a network controller sideband interface retimer for two NICs 116 connected with cables of different lengths, according to various embodiments. The circuit 400B is substantially similar to the circuit 400A of FIG. 4A except the circuit 400B of FIG. 4B includes a NIC retimer apparatus 102 on a retimer card 104. In some embodiments, NIC 1 116a might be connected to the NIC retimer apparatus 102 with a cable that is a different length than the cable connecting NIC 2 116b. In such circumstances, a second delayed clock signal Clk-2OS2 is useful.

In some embodiments, the delay is a first delay, the delayed second clock signal Clk-2OS is a first delayed second clock signal Clk-2OS, and the NIC 116 is a first NIC (e.g., NIC 1) 116a. In the embodiments, the second clock circuit 202 is further configured to transmit the second clock signal Clk-2 to a second NIC (NIC 2) 116b. In the embodiments, the NIC data relay circuit 204 is configured to receive data packets from the first NIC 116a on a first RMII bus and to transmit the received data packets to the BMC 110 over a second RMII bus (RX_Dat) and is further configured to receive data packets from the second NIC 116b on a third RMII bus.

In the embodiments, the clock delay circuit 206, for example, through the PLL 402, is further configured to add a second delay to the second clock signal Clk-2 to create a second delayed clock signal Clk-2OS2. The delay is adjusted to cause the second delayed clock signal Clk-2OS2 to coincide with a time during receipt of data packets received from the second NIC 116b when data of each bit of the data packets received from the second NIC 116b is valid. Note that the second delayed clock signal Clk-2OS2 is connected to the IO FF 406 connected to the second NIC 116b and to RX2_FIFO 408 while the first delayed clock signal Clk-2OS is connected to the IO FF 406 connected to the first NIC 116a and to RX1 FIFO 408. Otherwise, the circuit 400B of FIG. 4B is the same as the circuit 400A of FIG. 4A.

Figure 4C:
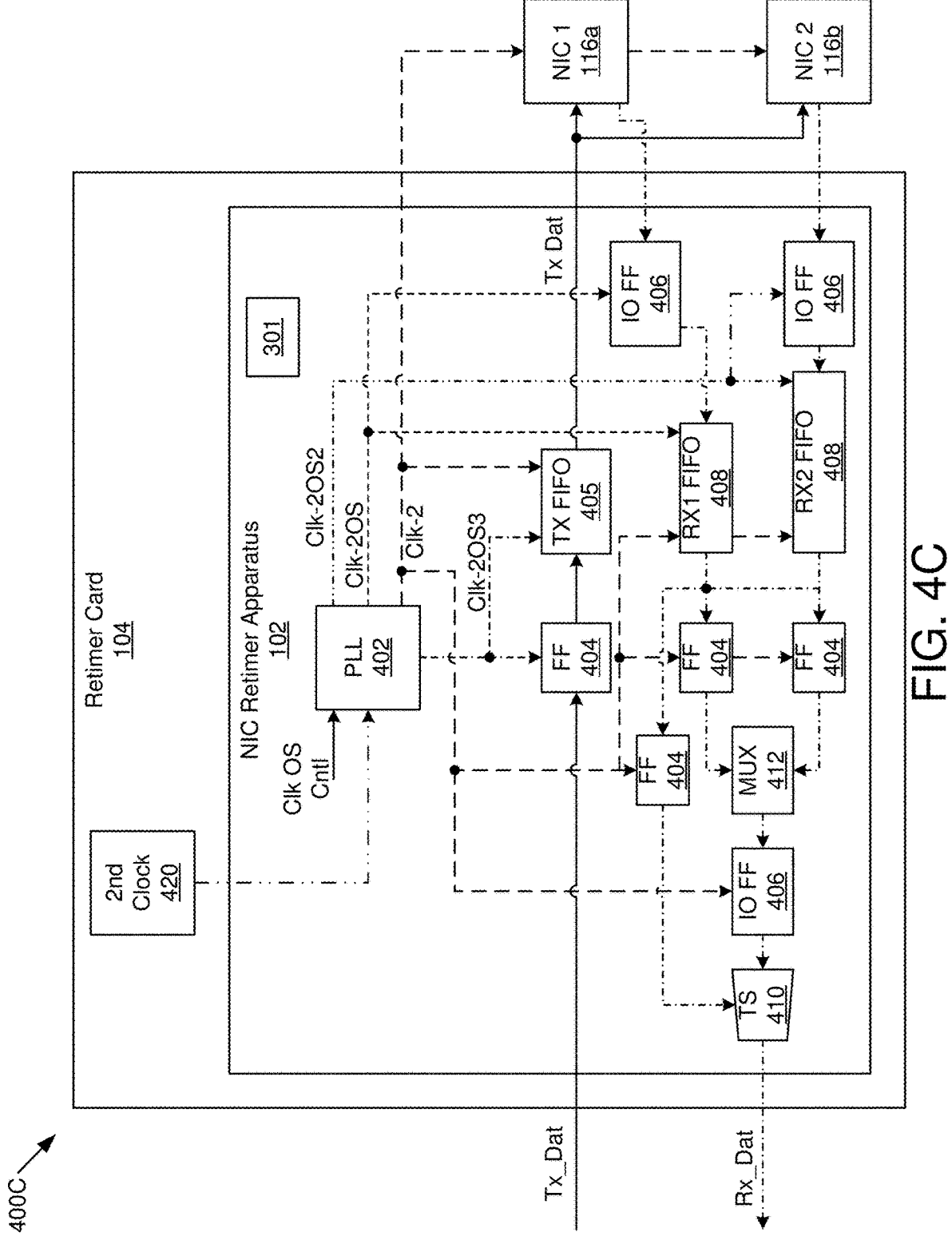
FIG. 4C is a schematic block diagram illustrating a circuit for a network controller sideband interface retimer, for two NICs connected with cables of different lengths and variable cable length to a BMC, according to various embodiments.

FIG. 4C is a schematic block diagram illustrating a circuit 400C for a network controller sideband interface retimer, for two NICs connected with cables of different lengths and variable cable length to a BMC 110, according to various embodiments. The circuit 400C of FIG. 4C is the same as the circuit 400B of FIG. 4B except for the addition of a third delayed second clock signal Clk-2OS3 and a second clock 420. In some embodiments, the NIC retimer apparatus 102 is connected to the BMC 110 via a cable or other conductors where a length of the cable and/or conductors could affect validating data coming from the BMC 110. In such embodiments, the clock delay circuit 206 is further configured to add a third delay to the second clock signal Clk-2 to create a third delayed clock signal Clk-2OS3. The delay is adjusted to cause the third delayed clock signal Clk-2OS3 to coincide with a time during receipt of data packets from the BMC 110 when data of each bit of the data packets received from the BMC 110 is valid.

In some embodiments, the circuit 400C includes a second clock 420 connected to the PLL 402 instead of first clock signal Clk-1. In such embodiments, the first clock signal Clk-1 is decoupled from the second clock 420. Such an embodiment is useful for variable length cables/conductors between the BMC 110 and NIC retimer apparatus 102. While the NIC retimer apparatus 102 is depicted on a retimer card 104, in some embodiments, the NIC retimer apparatus 102 is not on a retimer card 104 and may be incorporated into the motherboard 106. In such embodiments, the data pathway from the BMC 110 to the NIC retimer apparatus 102 may be long enough where having the third delayed clock signal Clk-2OS3 is useful.

Figure 4D:
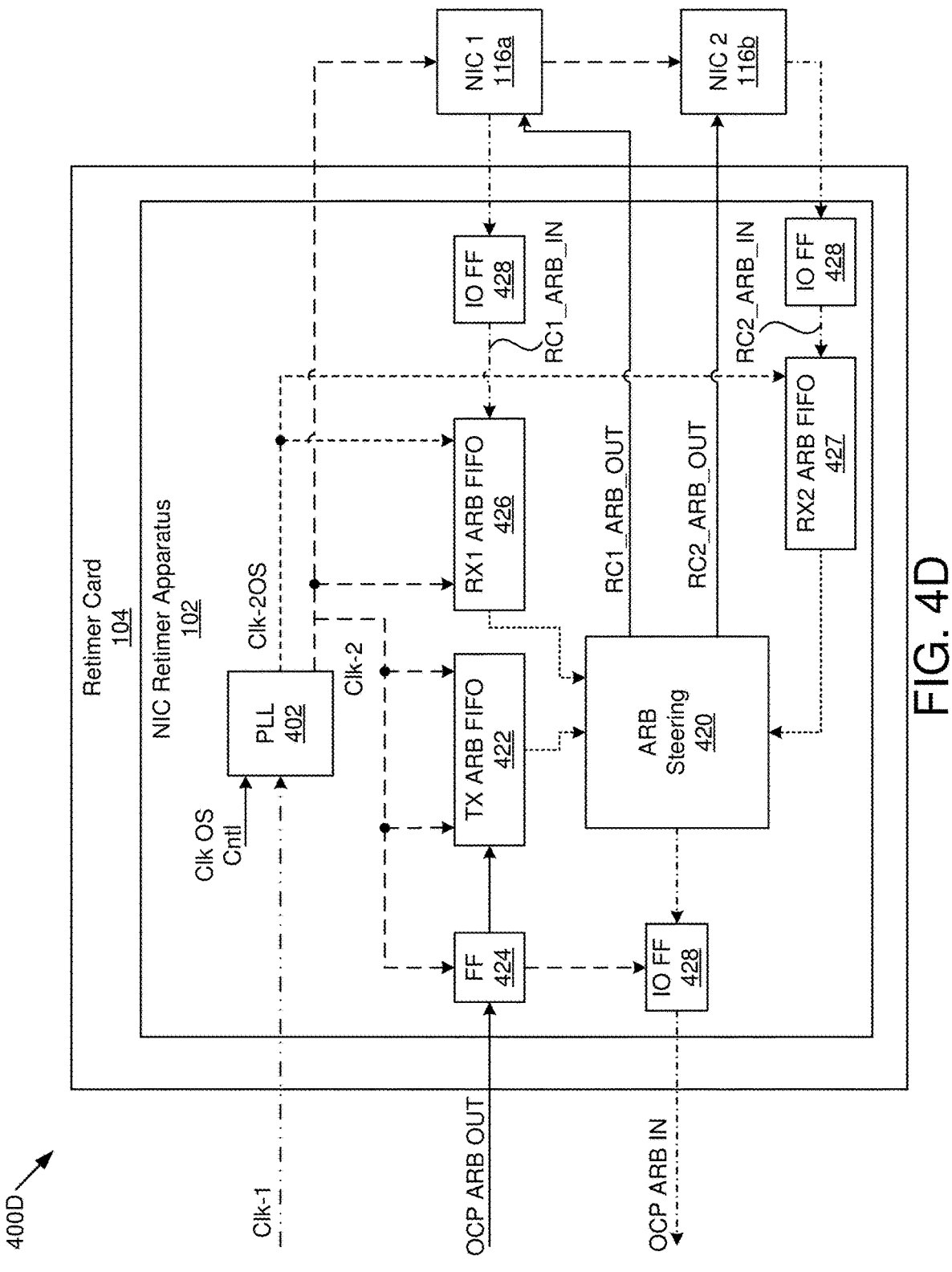
FIG. 4D is a schematic block diagram illustrating a circuit for an arbitration circuit for a network controller sideband interface retimer, according to various embodiments.

FIG. 4D is a schematic block diagram illustrating a circuit for an arbitration circuit 400D for a network controller sideband interface retimer, according to various embodiments. The arbitration circuit 400D of FIG. 4D is intended to function with the circuit 400A of FIG. 4A and provides a way for arbitration to work with multiple NICs 116 or other devices connected to the BMC 110. An arbitration loop typically goes between the NICs 116 and is able to disable lines connected to a NIC (e.g., NIC 2 116b) if not working or not present. The computing device 108, in some instances, is able to host up to eight devices and the arbitration loop provides a mechanism to exclude devices not working or to disable signals where devices are not present. In some instances, the computing device 108 may be shipped with one NIC (e.g., NIC 1 116a) so the arbitration circuit 400D of FIG. 4D is able to work to disable signals that would be intended for the second NIC 116b while handling the clock signals (e.g., the first clock signal Clk-1, the second clock signal Clk-2, and the delayed clock signal Clk-2OS). The transmit and receive FIFOs (e.g., TX ARB FIFO 422, RX1 ARB FIFO 426, RX2 ARB FIFO 427), FFs 424, and IO FFs 428 act to revive and buffer data. In other embodiments, the arbitration circuit 400D of FIG. 4D may also use a second delayed clock signal Clk-2OS2 and/or a third delayed clock signal Clk-2OS3) corresponding to the circuits 400B, 400C of FIGS. 4B and 4C.

Figure 5:
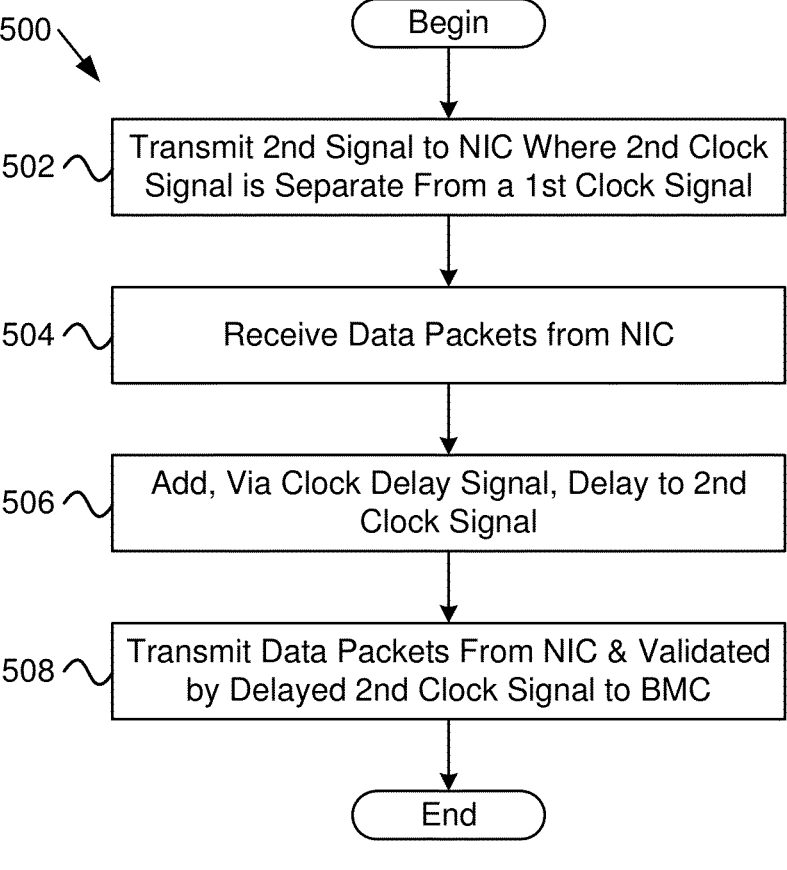
FIG. 5 is a schematic flow chart diagram illustrating a method for a network controller sideband interface retimer, according to various embodiments.

FIG. 5 is a schematic flow chart diagram illustrating a method 500 for a network controller sideband interface retimer, according to various embodiments. The method 500 begins and transmits 502 a second clock signal Clk-2 to a NIC 116. The second clock signal Clk-2 is separate from a first clock signal Clk-1 from a clock 112 connected to a BMC 110. The method 500 receives 504 data packets from the NIC 116 on a first RMII bus. The method 500 adds 506 a delay to the second clock signal Clk-2 to create a delayed second clock signal Clk-2OS. The delay adjusted to cause the delayed second clock signal Clk-2OS to coincide with a time during receipt of the data packets received from the NIC 116 when data of each bit of the data packets received from the NIC 116 is valid. The method 500 transmits 508 the received data packets to the BMC 110 over a second RMII bus, and the method 500 ends. In various embodiments, all or a portion of the method 500 is implemented using the second clock circuit 202, the NIC data relay circuit 204, and/or the clock delay circuit 206.

FIG. 6 is a schematic flow chart diagram illustrating another method 600 for a network controller sideband interface retimer, according to various embodiments. The method 600 begins and receives 602 a first clock signal Clk-1 and transmits 604 a second clock signal Clk-2 to a NIC 116. The second clock signal Clk-2 is separate from the first clock signal Clk-1 from a clock 112 connected to a BMC 110. In some embodiments, the method 600 synchronizes the second clock signal Clk-2 with the first clock signal Clk-1. The method 600 adds 606 a delay to the second clock signal Clk-2 to create a delayed second clock signal Clk-2OS. The delay is adjusted to cause the delayed second clock signal Clk-2OS to coincide with a time during receipt of the data packets received from the NIC 116 when data of each bit of the data packets received from the NIC 116 is valid.

While the clock signals are being received 602, transmitted 604, and delay is added 606, the method 600 receives 608 data packets from the BMC 110 and relays 610 the received data packets from the BMC 110 to the NIC 116. The method 600 receives 612 data packets from the NIC 116 on a first RMII bus and validates 614 the data packets from the NIC 116 using the delayed clock signal Clk-2OS, and transmits 616 the data packets from the NIC 116 that have been validated by the delayed second clock signal Clk-2OS to the BMC 110, and the method 600 returns to repeat the steps of the method 600. In various embodiments, all or a portion of the method 600 is implemented using the second clock circuit 202, the NIC data relay circuit 204, the clock delay circuit 206, and/or the BMC data relay circuit 316.

FIG. 7 is a schematic flow chart diagram illustrating a method 700 for calibrating a network controller sideband interface retimer, according to various embodiments. The method 700 begins and identifies 702 a trigger event to cause the BMC 110 to repeatedly transmit calibration commands and the method 700 causes 704 transmission of a calibration command from the BMC 110. A trigger event may be a user command, a hardware testing procedure, a system reboot, a system power on event, and/or detecting installation and/or power on of the NIC 116, the BMC 110, and/or the NIC retimer apparatus 102. The method 700 adjusts 706 the delay to the second clock signal Clk-2 over an adjustment range while reading known responses received from the NIC 116. Each known response from the NIC 116 is received in response to the NIC 116 receiving a plurality of identical calibration commands from the BMC 110. Each calibration command is configured to elicit the known response from the NIC 116.

The method 700 reads 708 each known response received from the NIC 116 and compares 710 the received known response to an expected response. The method 700 determines 712 if the known response matches the expected response, which validates the data of the received known response. In response to determining 712 if the received known response matches the expected response, the method 700 records 714 the received known response and analyzes 716 to define a valid data range. The method 700 determines 718 if a valid data range is defined. If the method 700 determines that a valid data range has not been defined, the method 700 returns to cause 704 another calibration command to be sent from the BMC 110 to the NIC 116 and adjusts 706 the delay to the second clock signal Clk-2 to an different value and then reads 708 a next known response from the NIC 116. The method 700 repeats adjusting 706 the delay to the second clock signal Clk-2 over the adjustment range, while causing 704 the BMC 110 to transmit the calibration command, and reading the known response received from the NIC 116 until the method 700 determines 718 that a valid data range is defined.

The method 700 sets 720 the delay of the delayed second clock signal Clk-2OS to a value within a valid signal range of delay corresponding to received responses matching the expected response and stops 722 the BMC 110 from transmitting the calibration command, and the method 700 ends. In various embodiments, all or a portion of the method 700 is implemented using the second clock circuit 202, the NIC data relay circuit 204, the clock delay circuit 206, the BMC data relay circuit 316, the delay adjustment module 302, the response reader module 304, the valid data module 306, the delay setting module 308, the signal calibration module 310, the calibration termination module 312, and/or the delay calibration trigger module 314.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a second clock circuit configured to transmit a second clock signal to a network interface card ("NIC") of a computing device, wherein the second clock signal is separate from a first clock signal from a clock connected to a baseboard management controller ("BMC") of the computing device;
   a NIC data relay circuit configured to receive data packets from the NIC on a first reduced media independent interface ("RMII") bus and to transmit the received data packets to the BMC over a second RMII bus, wherein the received data packets to the BMC are received on an RMII bus separate from a data pathway for data packets transmitted from the NIC to a processor of the computing device; and
   a clock delay circuit configured to add a delay to the second clock signal to create a delayed second clock signal, the delay adjusted to cause the delayed second clock signal to coincide with a time during receipt of the data packets received from the NIC when data of a bit of the data packets received from the NIC is valid, the delay calculated to compensate for propagation delay for a signal pathway from the NIC to the apparatus.

2. The apparatus of claim 1, further comprising a delay calibration apparatus comprising:
   a delay adjustment module configured to adjust the delay to the second clock signal over an adjustment range while reading known responses received from the NIC, each known response from the NIC received in response to the NIC receiving a plurality of identical calibration commands from the BMC, each calibration command configured to elicit the known response from the NIC;
   a response reader module configured to read each known response received from the NIC and to compare each of the received known responses to an expected response;
   a valid data module configured to determine an amount of delay associated with each received known response matching the expected response; and a delay setting module configured to set the delay of the delayed second clock signal to a value within a valid signal range of delay corresponding to received responses matching the expected response,
   wherein said modules comprise one or more of hardware circuits, a programmable hardware device, and code executable on a processor, the code stored on one or more computer readable storage media.

3. The apparatus of claim 2, further comprising:
   a signal calibration module configured to cause the BMC repeatedly transmit the calibration command to the NIC; and
   a calibration termination module configured to cause the BMC to stop transmission of the calibration command to the NIC in response to the delay setting module setting the delay of the delayed second clock signal.

4. The apparatus of claim 3, further comprising a delay calibration trigger module configured to direct the signal calibration module to cause the BMC to transmit the calibration command in response to a user command, a hardware testing procedure, a system reboot, a system power on event, and/or detecting installation and/or power on of the NIC, the BMC, and/or the apparatus.

5. The apparatus of claim 2, wherein the delay setting module sets the delay in a middle of the valid signal range.

6. The apparatus of claim 1, wherein the second clock circuit is further configured to receive the first clock signal from a clock connected to the BMC and wherein the second clock signal is synchronized with the first clock signal.

7. The apparatus of claim 1, wherein the RMII bus uses a network controller sideband interface ("NC-SI") protocol.

8. The apparatus of claim 1, further comprising a BMC data relay circuit configured to receive data packets from the BMC and to relay the received data packets from the BMC to the NIC.

9. The apparatus of claim 1, wherein the apparatus is configured on a card configured to insert into an open configuration project ("OCP") slot of a computing device comprising the BMC and the NIC.

10. The apparatus of claim 1, wherein:
   the delay is a first delay, the delayed second clock signal is a first delayed second clock signal, and the NIC is a first NIC, and wherein:
      the second clock circuit is further configured to transmit the second clock signal to a second NIC;
      the NIC data relay circuit is further configured to receive data packets from the second NIC on a third RMII bus; and
      the clock delay circuit is further configured to add a second delay to the second clock signal to create a second delayed clock signal, the second delay adjusted to cause the second delayed clock signal to coincide with a time during receipt of data packets received from the second NIC when data of each bit of the data packets received from the second NIC is valid; and/or
   the clock delay circuit is further configured to add a third delay to the second clock signal to create a third delayed clock signal, the third delay adjusted to cause the third delayed clock signal to coincide with a time during receipt of data packets from the BMC when data of each bit of the data packets received from the BMC is valid.

11. A method comprising:
   transmitting a second clock signal to a network interface card ("NIC") of a computing device, wherein the second clock signal is separate from a first clock signal from a clock connected to a baseboard management controller ("BMC") of the computing device;

receiving data packets from the NIC on a first reduced media independent interface ("RMII") bus, wherein the received data packets to the BMC are received on an RMII bus separate from a data pathway for data packets transmitted from the NIC to a processor of the computing device;

adding a delay to the second clock signal to create a delayed second clock signal, the delay adjusted to cause the delayed second clock signal to coincide with a time during receipt of the data packets received from the NIC when data of a bit of the data packets received from the NIC is valid, the delay calculated to compensate for propagation delay for a signal pathway from the NIC to the apparatus; and transmitting the received data packets to the BMC over a second RMII bus.

12. The method of claim 11, further comprising:

adjusting the delay to the second clock signal over an adjustment range while reading known responses received from the NIC, each known response from the NIC received in response to the NIC receiving a plurality of identical calibration commands from the BMC, each calibration command configured to elicit the known response from the NIC;

reading each known response received from the NIC;

comparing each of the received known responses to an expected response;

determining an amount of delay associated with each received known response matching the expected response; and setting the delay of the delayed second clock signal to a value within a valid signal range of delay corresponding to received responses matching the expected response.

13. The method of claim 12, further comprising:

causing the BMC to start repeatedly transmitting the calibration command to the NIC; and causing the BMC to stop transmission of the calibration command to the NIC in response to setting the delay of the delayed second clock signal.

14. The method of claim 13, wherein causing the BMC to repeatedly transmit the calibration command to the NIC is in response to a user command, a hardware testing procedure, a system reboot, a system power on event, and/or detecting installation and/or power on of the NIC, the BMC, and/or a computing device comprising the BMC and NIC.

15. The method of claim 11, wherein the RMII bus uses a network controller sideband interface ("NC-SI") protocol.

16. The method of claim 11, further comprising:

prior to transmitting the second clock signal:

receiving the first clock signal from a clock connected to the BMC;

synchronizing the second clock signal with the first clock signal;

receiving data packets from the BMC; and relaying the received data packets from the BMC to the NIC.

17. The method of claim 11, wherein an apparatus comprising the method is configured on a card configured to insert into an open configuration project ("OCP") slot of a computing device comprising the BMC and the NIC.

18. A computing device comprising:

a processor;

a network interface card ("NIC");

a baseboard management controller ("BMC");

a second clock circuit configured to transmit a second clock signal to the NIC, wherein the second clock signal is separate from a first clock signal from a clock connected to the BMC;

a NIC data relay circuit configured to receive data packets from the NIC on a reduced media independent interface ("RMII") bus and to transmit the received data packets to the BMC over an RMII bus, wherein the received data packets to the BMC are received on an RMII bus separate from a data pathway for data packets transmitted from the NIC to a processor of the computing device; and a clock delay circuit configured to add a delay to the second clock signal to create a delayed second clock signal, the delay adjusted to cause the delayed second clock signal to coincide with a time during receipt of the data packets received from the NIC when data of a bit of the data packets received from the NIC is valid, the delay calculated to compensate for propagation delay for a signal pathway from the NIC to the apparatus, wherein said circuits comprise one or more of hardware circuits, a programmable hardware device, and code executable on a processor, the code stored on one or more computer readable storage media.

19. The computing device of claim 18, further comprising a delay calibration apparatus comprising:

a delay adjustment module configured to adjust the delay to the second clock signal over an adjustment range while reading known responses received from the NIC, each known response from the NIC received in response to the NIC receiving a plurality of identical calibration commands from the BMC, each calibration command configured to elicit the known response from the NIC;

a response reader module configured to read each known response received from the NIC and to compare each of the received known responses to an expected response;

a valid data module configured to determine an amount of delay associated with each received known response matching the expected response; and a delay setting module configured to set the delay of the delayed second clock signal to a value within a valid signal range of delay corresponding to received responses matching the expected response, wherein said modules comprise one or more of hardware circuits, a programmable hardware device, and code executable on a processor, the code stored on one or more computer readable storage media.

20. The computing device of claim 18, wherein:

the RMII bus uses a network controller sideband interface ("NC-SI") protocol;

an apparatus comprising the second clock circuit, the NIC data relay circuit, and the clock delay circuit is configured on a card configured to insert into an open configuration project ("OCP") slot of a computing device comprising the BMC and the NIC; and/or prior to transmitting the second clock signal, the second clock circuit is further configured to receive the first clock signal from a clock connected to the BMC and to synchronize the second clock signal with the first clock signal, and further comprising a BMC data relay circuit configured to receive data packets from the BMC and to relay the received data packets from the BMC to the NIC.

* * * * *